United States Patent [19]

Kaji

[11] Patent Number: 5,694,897
[45] Date of Patent: Dec. 9, 1997

[54] WATER TEMPERATURE SENSOR FAILURE DETECTING DEVICE FOR IDLE SPEED CONTROL SYSTEM

[75] Inventor: Yasumasa Kaji, Toyota, Japan

[73] Assignee: Denso Corporation, Kariya, Japan

[21] Appl. No.: 780,154

[22] Filed: Dec. 26, 1996

[30] Foreign Application Priority Data

Jan. 26, 1996 [JP] Japan ............. 8-011883

[51] Int. Cl.$^6$ ............................................. F02D 41/08
[52] U.S. Cl. ......................... 123/339.15; 123/339.24
[58] Field of Search ................... 123/339.15, 339.24, 123/479, 588

[56] References Cited

U.S. PATENT DOCUMENTS

| | | | |
|---|---|---|---|
| 4,760,824 | 8/1988 | Sakurai | 123/339.15 |
| 4,887,570 | 12/1989 | Meicher | 123/339.15 |
| 5,003,954 | 4/1991 | Yakuwa et al. | 123/479 |
| 5,048,483 | 9/1991 | Nakazawa | 123/339.24 |
| 5,551,396 | 9/1996 | Suzuki et al. | 123/479 |

FOREIGN PATENT DOCUMENTS

| | | | |
|---|---|---|---|
| 58-82043 | 5/1983 | Japan . | |
| 60-22042 | 2/1985 | Japan . | |
| 60-40755 | 3/1985 | Japan . | |
| 82250 | 4/1987 | Japan | 123/339.15 |
| 63-189629 | 8/1988 | Japan . | |
| 187854 | 7/1992 | Japan | 123/339.15 |
| 7-99212 | 10/1995 | Japan . | |

*Primary Examiner*—Willis R. Wolfe
*Attorney, Agent, or Firm*—Nixon & Vanderhye P.C.

[57] ABSTRACT

To provide a water temperature sensor failure detecting device for an idle speed control system of an internal combustion engine which eliminates the need for a bimetallic guard mechanism, an aperture characteristic of an idle control valve (ISCV) when normal becomes a larger degree of opening as coolant water temperature drops, and bypass airflow supplied to an engine is increased. During failure of a water temperature sensor, a duty value for driving the ISCV is set at 50%, the ISCV is opened substantially halfway, and the bypass airflow supplied to the engine is caused to be a neutral flow. In this way, by causing the bypass airflow during failure of the water temperature sensor to be a neutral flow, a worst state of overrun, engine stall and the like can be prevented, and startability when at low temperature and operability after engine warmup can be ensured.

16 Claims, 5 Drawing Sheets

WATER TEMPERATURE SENSOR FAILURE DETECTING DEVICE FOR IDLE SPEED CONTROL SYSTEM

CROSS-REFERENCE TO RELATED APPLICATION

The present application is related to and claims priority from Japanese Patent Application No. Hei. 8-11883.

BACKGROUND OF THE INVENTION

1. Field of the Invention

This invention relates to a control apparatus for an internal combustion engine which can suppress an abnormal rise in idle speed of an internal combustion engine at a time of failure of a water temperature sensor.

2. Description of Related Art

Prior art idle speed control of an engine has established a target idle speed to be higher than ordinary and increased an amount of intake air in order to overcome a high degree of friction when the engine is cold in comparison with a condition after engine warmup or to warm the engine quickly. Consequently, if a water temperature sensor for detecting coolant water temperature of the engine should fail and an air quantity to be provided when the engine is at low temperature is provided to the engine after warmup, idle speed may increase abnormally.

To prevent this, an idle speed control valve (hereinafter abbreviated "ISCV") of a rotary solenoid type may be provided with a guard mechanism of bimetallic type. This bimetallic type guard mechanism restricts intake air quantity in correspondence with coolant water temperature by the bimetallic being displaced in correspondence with coolant water temperature and restricting a range of the degree of opening of the ISCV to establish startability when at a low temperature and operability after engine warmup, while preventing an abnormal rise in idle speed during failure of the water temperature sensor.

However, the bimetallic type guard mechanism increases the number of parts of an ISCV and decreases assembly ease of the ISCV and becomes a factor in causing production costs to rise. For this reason, it is desirable to eliminate the bimetallic type guard mechanism, but when the bimetallic type guard mechanism is eliminated, the idle speed rises abnormality upon failure of the water temperature sensor, and startability when at low temperatures as well as operability after engine warmup deteriorate.

SUMMARY OF THE INVENTION

In light of the foregoing problems of the prior art, it is an object of the present invention to provide a control apparatus for an internal combustion engine which can be provided at low cost with a novel device in place of a guard mechanism of bimetallic type as a countermeasure during failure of a water temperature sensor.

To achieve the foregoing object, a control apparatus for an internal combustion engine according to a first aspect of the present invention has a failure detecting device for detecting failure of a water temperature sensor, and during failure of the water temperature sensor, a controlling device controls an idle intake air control valve so that idle intake airflow becomes neutral. Here, "neutral flow" is an intermediate flow between upper and lower limits of airflow adjustable by an idle intake air control valve; startability when at low temperature and operability after engine warmup are provided while preventing an abnormal rise in idle speed during failure of the water temperature sensor by causing idle intake airflow during failure of the water temperature sensor to become neutral. With this structure, the bimetallic type guard mechanism according to the prior art can be abandoned, and along with this, a countermeasure for a time of failure of the water temperature sensor can be realized at low cost through software.

There are two methods for controlling idle intake airflow: a bypass air method to control, with a valve, in which airflow passing through a bypass intake air passage (hereinafter termed "bypass airflow") bypasses a throttle valve, and a throttle valve direct-acting method to control a fully closed position of a throttle valve with an actuator, thereby controlling airflow passing through the throttle valve. Furthermore, the bypass air method may employ either a solenoid valve or a valve of a stepper motor drive type as the valve (idle intake air control valve) to control the bypass airflow.

In a case where this invention is applied to an apparatus of the bypass air method employing a solenoid valve, it is sufficient to control the solenoid valve to open substantially halfway when failure of the water temperature sensor has been detected by the failure detecting device. That is to say, bypass airflow (idle intake airflow) becomes neutral and an abnormal rise in idle speed during failure of the water temperature sensor is prevented by opening the solenoid valve substantially halfway during failure of the water temperature sensor. In this case, the solenoid valve can be opened substantially halfway when drive duty of the solenoid valve during failure of the water temperature sensor is controlled to substantially 50%.

In a case where this invention is applied to an apparatus of the bypass air method employing a valve of the stepper motor drive type, it is sufficient to control the valve of stepper motor drive type to open substantially halfway when failure of the water temperature sensor has been detected by the failure detecting device. In this case, it is sufficient to control the valve to open substantially halfway by establishing a number of drive steps of the stepper motor to be a number of steps which is substantially half a maximum number of steps during failure of the water temperature sensor.

In a case where this invention is applied to an apparatus of the throttle valve direct-acting type, it is sufficient to control the idle degree of opening of the throttle valve at a degree of opening which is substantially intermediate between upper and lower limits of idle degree of opening at a normal time when failure of the water temperature sensor has been detected by the failure detecting device. In this case, it is sufficient to control the idle degree of opening of the throttle valve at an intermediate degree of opening when at low temperature and idle degree of opening after warmup during failure of the water temperature sensor. Furthermore, coolant water temperature when failure of the water temperature sensor has been detected by the failure detecting device may be regarded as temperature after engine warmup, and fuel injection control and ignition timing control may be performed.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

3

Figure 1:
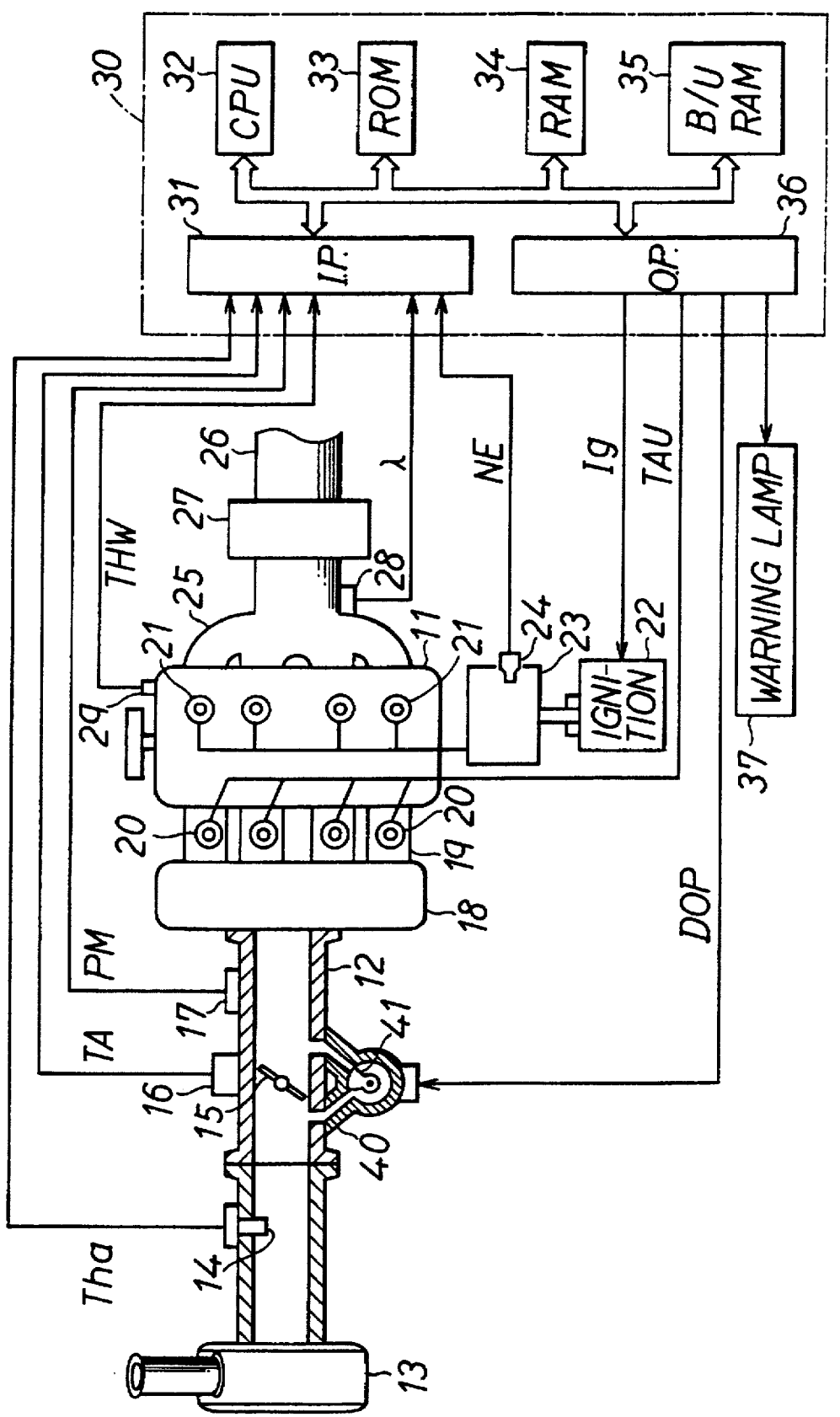
Figure 2:
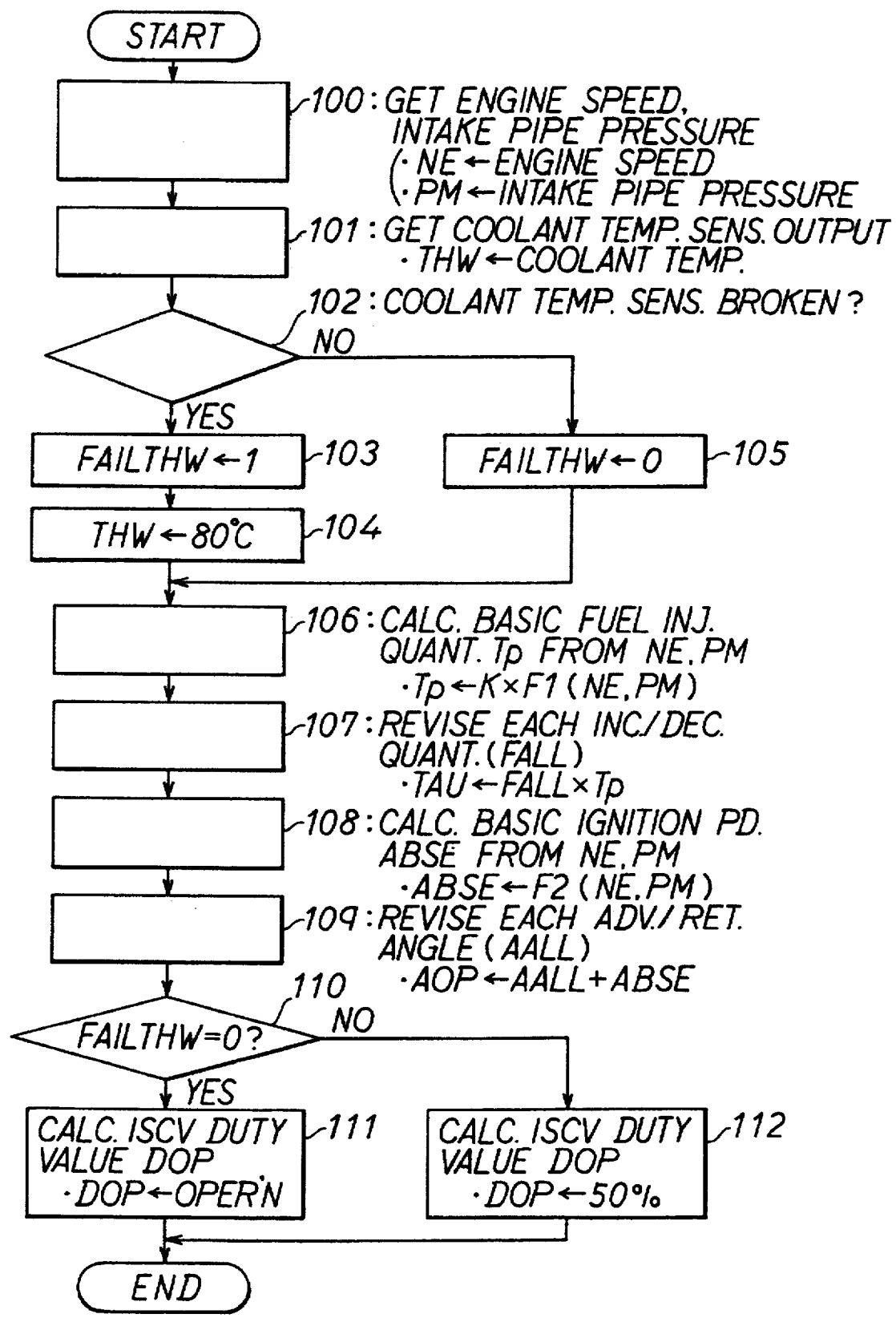
Figure 3:
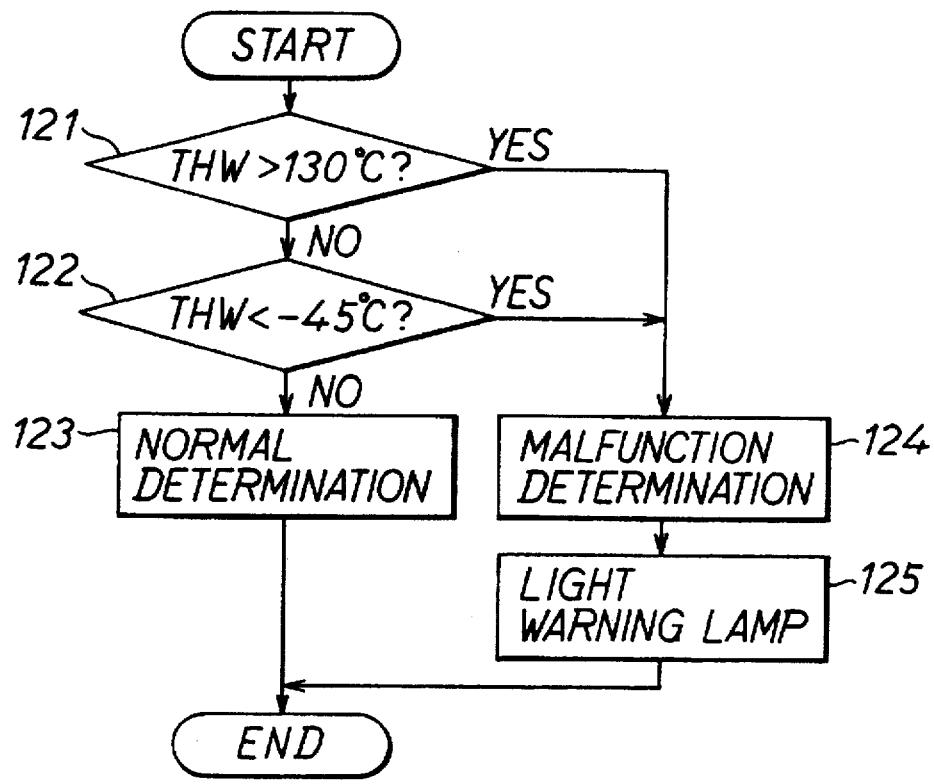
Figure 4:
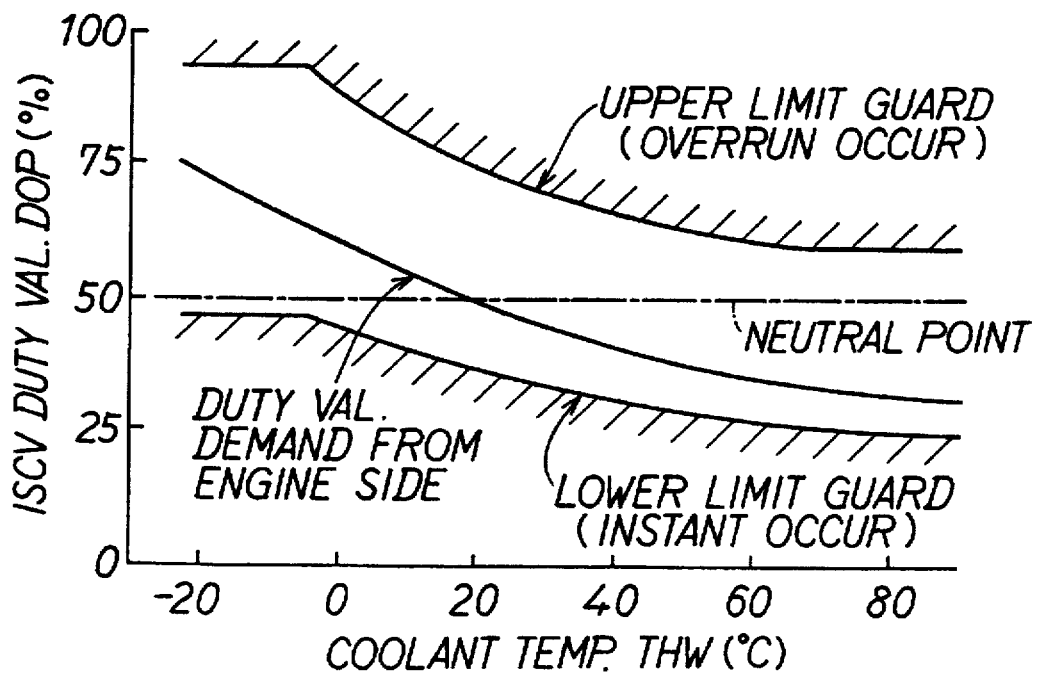
Figure 5:
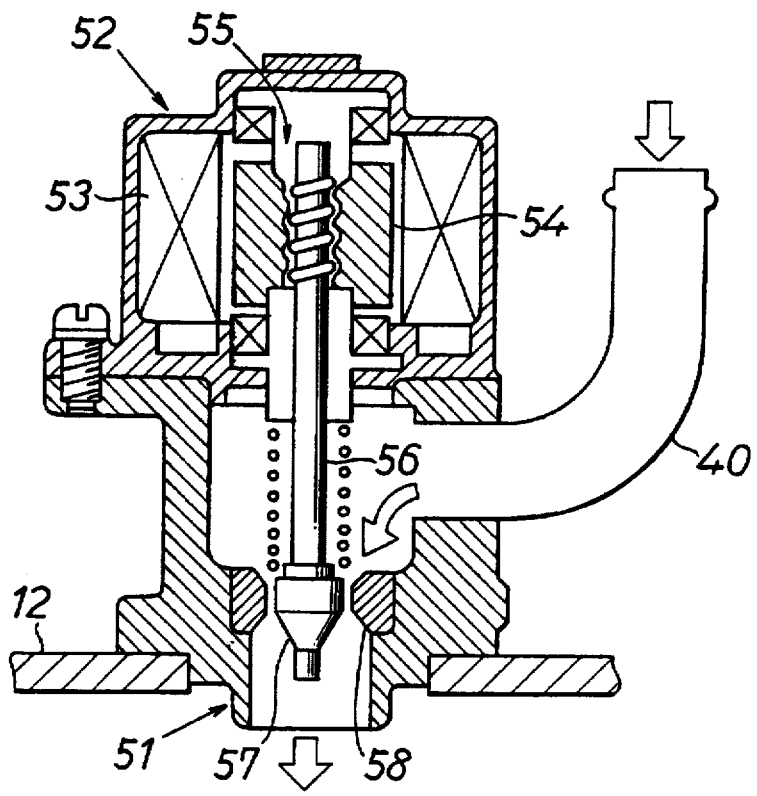
Figure 6:
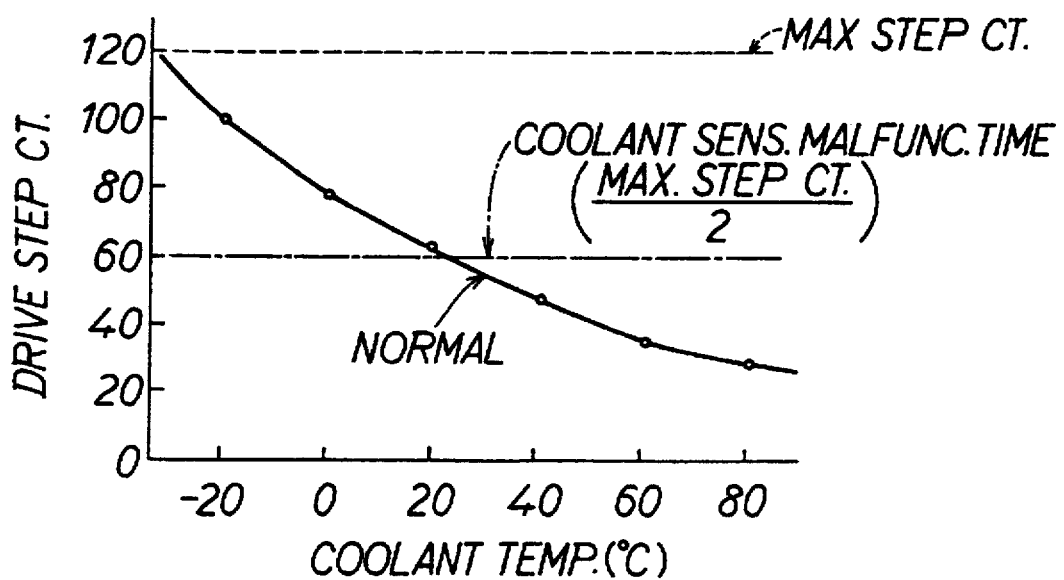
Figure 7:
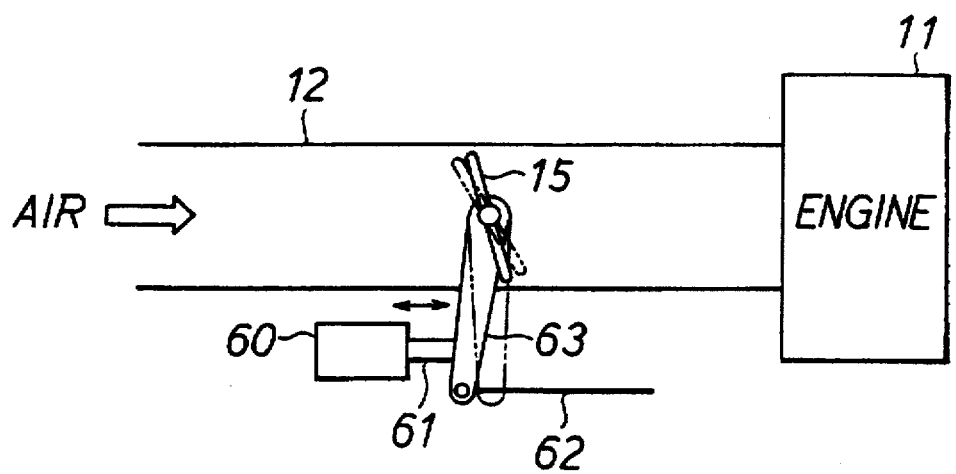
Figure 8:
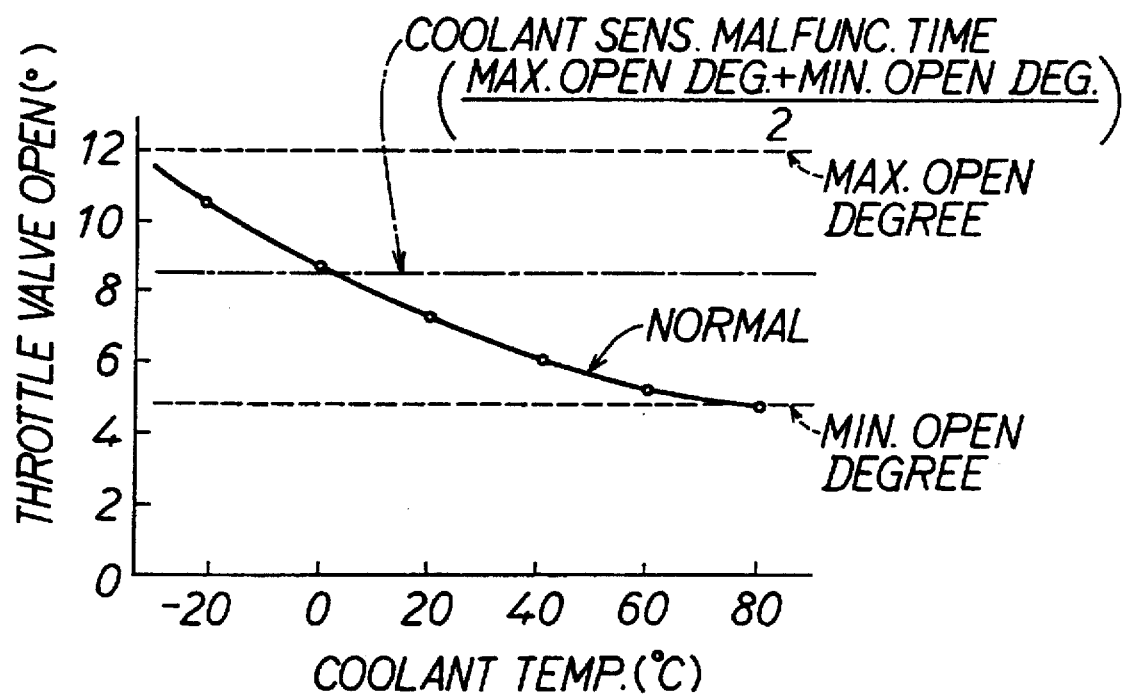

FIG. 1 shows an engine control system according to a first preferred embodiment of the present invention;

FIG. 2 is a flowchart showing processing of a base routine according to the first embodiment;

FIG. 3 is a flowchart showing processing of a water temperature sensor failure diagnosis routine in the first embodiment;

FIG. 4 is a graph showing a relationship between coolant water temperature and ISCV duty value DOP during idle;

FIG. 5 is a cross-sectional view of an ISC valve of the stepper motor drive type used in a second preferred embodiment of the present invention;

FIG. 6 is a graph showing a relationship between coolant water temperature and number of drive steps of a stepper motor during idle in the second embodiment;

FIG. 7 shows an ISC system of the throttle valve direct-acting type used in a third preferred embodiment of the present invention; and FIG. 8 is a graph showing a relationship between coolant water temperature and throttle valve degree of opening during idle in the third embodiment.

DETAILED DESCRIPTION OF THE PRESENTLY PREFERRED EXEMPLARY EMBODIMENTS

A first preferred embodiment of the present invention will be described hereinafter with reference to FIGS. 1 through 4. First, the overall structure of the engine control system will be described with reference to FIG. 1. An air cleaner 13 is disposed in a most upstream portion of an air intake pipe 12 of an engine 11 which is an internal combustion engine. An intake air temperature sensor 14 for detecting intake air temperature Tha is provided on a downstream side of the air cleaner 13, and a throttle valve 15 and a throttle aperture sensor 16 are provided on a downstream side of the intake air temperature sensor 14. A bypass intake air passage 40 which bypasses the throttle valve 15 is provided in the air intake pipe 12, and a rotary solenoid valve 41 is disposed in the bypass intake air passage 40 as an idle intake air control valve.

Meanwhile, an air intake pipe pressure sensor 17 for detecting air intake pipe pressure PM is provided on a downstream side of the throttle valve 15, and a surge tank 18 is disposed on a downstream side of the air intake pipe pressure sensor 17. An intake manifold 19 which conveys air to the cylinders of the engine 11 is connected to the surge tank 18, and fuel injection valves 20 for spraying fuel are respectively installed on the branching pipe portion for the cylinders of the intake manifold 19. A spark plug 21 is installed in each of the cylinders of the engine 11, and high voltage current generated by an ignition circuit 22 is supplied to the spark plugs 21 via a distributor 23. A crank angle sensor 24 for outputting, for example, twenty-four pulse signals per 720° CA (i.e., two rotations of a crankshaft) is provided on the distributor 23 for detecting engine speed NE according to the interval between the output pulses of the crank angle sensor 24. Additionally, a water temperature sensor 29 for detecting coolant water temperature THW is installed in a cylinder block of the engine 11.

Meanwhile, an exhaust pipe 26 is connected via an exhaust manifold 25 to an exhaust port (not shown) of the engine 11, and a three-way catalyst 27 to reduce noxious components (e.g., carbon monoxide, hydrocarbons, nitrogen oxides) in exhaust gas is disposed intermediately in the exhaust pipe 26. An air-fuel ratio sensor 28 for outputting a linear air-fuel ratio signal corresponding to an air-fuel ratio λ of the exhaust gas is provided on an upstream side of the three-way catalyst 27.

The output of the above-described various sensors is read into an electronic control unit 30 via an input port 31. The electronic control unit 30 is made up chiefly of a microprocessor and is provided with a CPU 32, a ROM 33, a RAM 34, and a backup RAM 35. The electronic control unit 30 computes fuel injection quantity TAU, ignition timing Ig, and the like using engine running state parameters obtained from the various sensor outputs, and outputs signals corresponding to the computed results from an output port 36 to the fuel injection valves 20 and the ignition circuit 22, thereby controlling running of the engine 11. Moreover, the electronic control unit 30 determines the presence or absence of failure of the water temperature sensor 29 by a water temperature sensor failure diagnosis routine shown in FIG. 3 which will be described later, and illuminates a warning light 37 to inform the driver of the failure.

Processing executed by the electronic control unit 30 will be described hereinafter with reference to FIGS. 2 and 3.

In the routine shown in FIG. 2, processing is started when an ignition switch (not shown) is switched on, and thereafter execution is repeated by interrupt processing at every predetermined time (for example every 4 ms), corresponding to the controlling device as recited in the appended claims. When processing of the base routine is started, firstly in Step 100, engine speed NE and air intake pipe pressure PM detected by the crank angle sensor 24 and the air intake pipe pressure sensor 17 are read in, and subsequently in Step 101, coolant water temperature THW detected by the water temperature sensor 29 is lead in. Accordingly, in subsequent Step 102, the water temperature sensor failure diagnosis routine in FIG. 3 determines whether the water temperature sensor 29 has failed as follows.

In the water temperature sensor failure diagnosis routine in FIG. 3, Step 121 determines whether coolant water temperature THW detected by the water temperature sensor 29 is higher than a temperature (for example, 130° C.) which cannot occur in a normal running state, and when the temperature is 130° C. or less, the subsequent Step 122 determines whether coolant water temperature THW is an extremely low temperature (for example, –45° C.) which cannot occur even in severe winter. That is, Steps 121 and 122 determine whether coolant water temperature THW detected by the water temperature sensor 29 is a temperature which cannot occur in a normal state, and when coolant water temperature THW is a temperature which cannot occur in a normal state, output of the water temperature sensor 29 is determined to be abnormal. In this case, a determination result of "Yes" is made in one or the other of Steps 121 and 122, execution advances to Step 124, the water temperature sensor 29 is determined to have failed, and in subsequent Step 125, the warning light 37 is illuminated to inform the driver of failure of the water temperature sensor 29.

In contrast to this, when the coolant water temperature THW detected by the water temperature sensor 29 is within a normal temperature range (–45° C. to 130° C.), the determination result is "No" in both Steps 121 and 122, execution advances to Step 123, and the water temperature sensor 29 is determined to be normal.

In a case where failure of the water temperature sensor 29 has been detected by the water temperature sensor failure diagnosis routine, execution advances to Step 103 in FIG. 2, a water temperature sensor failure flag FAILTHW is set to "1" to indicate failure, and in the subsequent Step 104, the water temperature detected by the water temperature sensor 29 is ignored and coolant water temperature THW is taken to be not less than 50° C. which is the temperature after engine warmup (for example, 80° C.), and execution advances to Step 106. In contrast to this, in a case where the water temperature sensor 29 is normal, execution advances to Step 105, the water temperature sensor failure flag FAIL-THW is set to "0" to indicate normality, and execution advances to Step 106.

In Step 106, a basic fuel injection quantity Tp is calculated by the following equation utilizing engine speed NE and air intake pipe pressure PM as shown in Equation (1):

$$Tp = K \times F1(NE, PM) \tag{1}$$

Here, K is a constant, and FI(NE, PM) is a function or two-dimensional map taking NE and PM as parameters.

Thereafter, in Step 107, the basic fuel injection quantity Tp is multiplied by a various quantity increase/decrease compensation coefficient FALL to determine a fuel injection quantity TAU. Here, the various quantity increase/decrease compensation coefficient FALL is calculated by the following Equation (2):

$$FALL = FTHA \times (1 + FOTP) \times (FAF + FKG) \times (1 + FASE + FWL) \tag{2}$$

where FTHA is intake air temperature compensation coefficient, FOTP is exhaust temperature rise quantity increase coefficient, FAF is air-fuel ratio feedback compensation quantity, FKG is an air-fuel ratio learning compensation quantity, FASE is an after-starting quantity increase, and FWL is a water temperature compensation coefficient.

After the fuel injection quantity TAU has been calculated utilizing the various quantity increase/decrease compensation coefficient FALL, in Step 108 in FIG. 2, a basic ignition timing ABSE is calculated by the following Equation (3) utilizing engine speed NE and air intake pipe pressure PM:

$$ABSE = F2(NE, PM) \tag{3}$$

Here, F2(NE, PM) is a function or two-dimensional map taking NE and PM as parameters.

Accordingly, in subsequent Step 109, the basic ignition timing ABSE is added to a various advance angle/retard angle compensation coefficient AALL to determine ignition timing AOP. Here, the various advance angle/retard angle compensation coefficient AALL is calculated by the following equation (4):

$$AALL = ACLD + AHOT + AEGR + AIDL - AACC \tag{4}$$

where ACLD is a compensating angle advance during engine warmup coefficient, AHOT is a compensating angle advance for overheating coefficient, AEGR is an EGR compensating angle advance coefficient, AIDL is an idle stabilizing angle advance coefficient, and AACC is an angle retard during acceleration coefficient.

After ignition timing AOP has been calculated utilizing the various advance angle/retard angle compensation coefficient AALL, Step 110 in FIG. 2 determines whether the water temperature sensor failure flag FAILTHW is "0" indicating normality, and when FAILTHW=0 (normal), execution advances to Step 111 and duty value DOP for driving the rotary solenoid valve for idle speed control 41 is calculated by the following Equation (5):

$$DOP = DSTA + DTHW + DFB + DAC + DB \tag{5}$$

where DSTA is a during-startup compensation term, DTHW is a water temperature compensation term, DFB is a feedback compensation term, DAC is an air conditioner "on" compensation term, and DB is an electrical load compensation term.

Meanwhile, in a case where FAILTHW=1 (failure of the water temperature sensor 29) in Step 110 in FIG. 2, execution advances to Step 112, and duty value DOP for driving the ISCV 41 is set at 50%. Because of this, the ISCV 41 is opened substantially halfway during failure of the water temperature sensor, and the bypass airflow supplied to the engine 11 is caused to be neutral flow.

FIG. 4 is a graph showing a relationship between duty value DOP of the rotary solenoid type ISCV 41 and coolant water temperature THW. A demand duty value of the ISCV 41 in a state of complete engine warmup (coolant water temperature THW=80° C.) is approximately 30%. The demand duty value rises as coolant water temperature THW drops, and the demand duty value becomes approximately 75% when coolant water temperature THW is −20° C. Because of this, an aperture characteristic of the ISCV 41 when normal becomes a larger degree of opening as coolant water temperature THW drops, and the bypass airflow supplied to the engine 11 is increased.

Additionally, an upper limit duty value (upper limit guard) at which idle speed does not rise abnormally (overrun) and a minimum duty value (lower limit guard) necessary for ensuring airflow to an extent that engine stall does not occur are also shown in FIG. 4. Basically, a worst state of overrun, engine stall, or the like can be avoided when duty value DOP of the ISCV 41 has entered within the upper or lower limit guard range. According to the prior art, these upper and lower limit guards were mechanically regulated by the bimetallic type guard mechanism so that a worst state of overrun, engine stall, or the like did not occur.

For example, when the water temperature sensor 29 fails and voltage corresponding to an extremely low temperature is output from the water temperature sensor 29 despite in actuality being in a warm engine state, the demand duty value of the ISCV 41 exceeds the upper limit guard, and unless there is some guard, an overrun occurs. Additionally, when voltage corresponding to a temperature after engine warmup is output from the water temperature sensor 29 during failure of the water temperature sensor 29, despite in actuality being in a low temperature state, the demand duty value of the ISCV 41 falls below the lower limit guard, and unless there is some safeguard, the engine stalls.

To prevent this, the foregoing first embodiment sets duty value DOP to drive the ISCV 41 to 50% during failure of the water temperature sensor 29, opening the ISCV 41 substantially halfway and causing the bypass airflow supplied to the engine 11 to be a neutral flow. Herein, "neutral flow" is flow (duty value) not less than the lower limit guard and not more than the upper limit guard in the overall temperature range in FIG. 4. Consequently, as long as it is not less than the lower limit guard and not more than the upper limit guard, a flow (duty value) other than 50% is acceptable. In this way, by causing the bypass airflow during failure of the water temperature sensor 29 to be neutral flow, a worst state of overrun, engine stall, or the like can be prevented, and startability when at low temperature and operability after engine warmup can be ensured.

Further, in an ISCV for which a fixed value fulfilling a condition of being not less than the lower limit guard and not more than the upper limit guard in the overall temperature range does not exist, duty value DOP during failure of the water temperature sensor may be established at a value proximate to the upper limit guard which does not conflict with the upper limit guard. Overrun during failure of the water temperature sensor can thereby be prevented. In this case, startability when at low temperature during failure of the water temperature sensor deteriorates, but when startability is poor, the driver starts the vehicle while depressing the accelerator pedal, and so starting when at low temperature also is possible.

Additionally, the foregoing first embodiment regards coolant water temperature during failure of the water temperature sensor 29 as being a temperature not less than 50° C., for example 80° C., and performs fuel injection control and ignition timing control. That is to say, during vehicle travel at a time other than idle, engine warmup has ended in substantially all cases except for a short time after starting, and so operability after engine warmup is enhanced by regarding coolant water temperature during failure of the water temperature sensor 29 as temperature after engine warmup.

In the above-described first embodiment, a rotary solenoid valve was utilized as the idle intake air control valve, but control identical to the foregoing first embodiment during failure of the water temperature sensor is applicable even in a system utilizing a linear solenoid valve.

Next, a second embodiment applying the present invention to a system providing an ISC valve of a stepper motor drive type intermediately in the bypass intake air passage in place of these ISC valves of the solenoid drive type will be described with reference to FIGS. 5 and 6.

First, the structure of a stepper motor drive type ISC valve 51 will be described briefly with reference to FIG. 5. A stepper motor 52 includes a rotor 54 made up of a permanent magnet in an inner diameter portion of a stator coil 53, and rotation of the rotor 54 is converted to vertical linear motion and conveyed to a valve shaft 56 via a feed screw mechanism 55. A needle valve 57 is installed on the tip of the valve shaft 56, and by adjusting an amount of vertical sliding displacement thereof with a number of drive steps of the stepper motor 52, an open surface area between the needle valve 57 and a valve seat 58 is adjusted and bypass airflow is adjusted.

FIG. 6 shows the relationship between the number of drive steps (corresponding to the required intake air quantity) and engine coolant water temperature in a case where the stepper motor drive type ISC valve 51 has been employed. When normal, the number of drive steps increases as coolant water temperature drops to increase bypass airflow when idling, similarly to the case of the above-described solenoid drive type ISC valve.

In contrast to this, bypass airflow is cased to be neutral flow during failure of the water temperature sensor by establishing the number of drive steps to be half of the maximum number of steps and opening the ISC valve 51 substantially halfway, avoiding a worst state of overrun, engine stall, or the like, and along with this, ensuring startability when at low temperature and operability after engine warmup. In this case as well, operability after engine warmup is enhanced by regarding coolant water temperature during failure of the water temperature sensor 29 as temperature after engine warmup (i.e., 50° C. or more) and performing fuel injection control and ignition timing control, similarly to the foregoing first embodiment.

Furthermore, the number of drive steps during failure of the water temperature sensor need not necessarily be half of the maximum number of steps, and may be established to be a number of steps such that bypass airflow is caused to be neutral flow.

The above-described first and second embodiments implement the present invention in idle speed control of a bypass air method providing an ISC valve 41 or 51 in a bypass intake air passage 40 to bypass a throttle valve 15, but the present invention is applicable also in a throttle valve direct-acting method to control a fully closed position of the throttle valve 15 with an actuator 60, thereby controlling airflow passing through the throttle valve 15, as shown in FIG. 7, while omitting the bypass intake air passage 40. With the throttle valve direct-acting method, a drive shaft 61 of the actuator 60 is a fully closed stopper of a throttle lever 63 interconnected with an accelerator cable 62, and controls airflow passing through the throttle valve 15 by ejecting and inserting the drive shaft during idling to adjust the fully closed stopper position. Additionally, although not shown, a DC motor, a feed screw for converting rotational displacement thereof to linear displacement of the drive shaft 61 and the like are incorporated within the actuator 60.

In an apparatus employing such a throttle valve direct-acting method, the degree of opening of the throttle valve 15 when normal becomes larger as coolant water temperature drops, and intake airflow during idle is increased, as in a third embodiment shown in FIG. 8.

In contrast to this, bypass airflow is cased to be neutral flow during idle by establishing the degree of opening of the throttle valve 15 during idle to be a degree of opening intermediate between a maximum degree of opening (degree of opening when at low temperature) and a minimum degree of opening (degree of opening when at high temperature), that is to say, (maximum degree of opening+minimum degree of opening)/2, at a time of failure of the water temperature sensor, avoiding a worst state of overrun, engine stall, or the like, and along with this, ensuring startability when at low temperature and operability after engine warmup. In this case as well, operability after engine warmup is enhanced by regarding coolant water temperature during failure of the water temperature sensor as temperature after engine warmup (i.e., 50° C. or more) and performing fuel injection control and ignition timing control, similarly to the foregoing first and second embodiments. Furthermore, the idle degree of opening during failure of the water temperature sensor need not necessarily be a degree of opening intermediate between the maximum degree of opening and the minimum degree of opening, and, in essence, may be established to be an idle degree of opening such that bypass airflow is caused to be neutral flow.

Additionally, this embodiment performs failure diagnosis of the water temperature sensor 29 by the water temperature sensor failure diagnosis routine in FIG. 3, but failure diagnosis may of course be performed with another method.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A control apparatus for an internal combustion engine, said apparatus comprising:

a temperature sensor for detecting a coolant temperature of said internal combustion engine;

an idle intake air control valve for controlling idle intake airflow of said internal combustion engine responsive to said detected coolant temperature;

failure detecting means for detecting failure of said coolant temperature sensor; and controlling means for controlling said idle intake air control valve so that idle intake airflow becomes a neutral flow when failure of said coolant temperature sensor has been detected by said failure detecting means.

2. The control apparatus of claim 1, wherein:

said idle intake air control valve is a solenoid valve disposed in a bypass intake air passage of said internal combustion engine to bypass a throttle valve of said engine; and said controlling means is for controlling said solenoid valve to open substantially halfway when failure of said coolant temperature sensor has been detected by said failure detecting means.

3. The control apparatus of claim 2, wherein said controlling means is for opening said solenoid valve substantially halfway by controlling a drive duty of said solenoid valve to be substantially 50% when failure of said coolant temperature sensor has been detected by said failure detecting means.

4. The control apparatus of claim 1, wherein:

said idle intake air control valve is a valve having a stepper motor drive, said valve being disposed in a bypass intake air passage of said internal combustion engine to bypass a throttle valve of said engine; and said controlling means is for controlling said valve to open substantially halfway when failure of said coolant temperature sensor has been detected by said failure detecting means.

5. The control apparatus of claim 4, wherein said controlling means is for opening said valve substantially halfway by establishing a number of drive steps of said stepper motor to be a number of steps which is substantially half a maximum number of steps when failure of said coolant temperature sensor has been detected by said failure detecting means.

6. The control apparatus of claim 1, wherein:

said idle intake air control valve is a throttle valve wherein throttle degree of opening during idling is regulated by an actuator; and said controlling means is for controlling an idle degree of opening of said throttle valve at a degree of opening which is substantially intermediate between upper and lower limits of idle degree of opening at a normal time when failure of said coolant temperature sensor has been detected by said failure detecting means.

7. The control apparatus of claim 6, wherein said controlling means is for controlling an idle degree of opening of said throttle valve at an intermediate degree of opening of idle degree of opening when at low temperature and idle degree of opening after warmup when failure of said coolant temperature sensor has been detected by said failure detecting means.

8. The control apparatus of claim 1, wherein said controlling means regards coolant temperature when failure of said coolant temperature sensor has been detected by said failure detecting means as temperature after engine warmup and performs fuel injection control and ignition timing control based thereupon.

9. A method of controlling idle speed of an internal combustion engine, said method comprising the steps of:

detecting a coolant temperature of said internal combustion engine using a coolant temperature sensor;

controlling idle intake airflow of said internal combustion engine responsive to said detected coolant temperature;

detecting failure of said coolant temperature sensor; and controlling said idle intake air control valve so that idle intake airflow is a neutral flow responsive to detection of failure of said coolant temperature sensor.

10. The method of claim 9, wherein:

said idle intake air controlling step is performed using a solenoid valve disposed in a bypass intake air passage of said internal combustion engine to bypass a throttle valve of said engine; and said controlling step includes a step of controlling said solenoid valve to open substantially halfway responsive to detection of failure of said coolant temperature sensor.

11. The method of claim 10, wherein said controlling step includes a step of opening said solenoid valve substantially halfway by controlling a drive duty of said solenoid valve to be substantially 50% responsive to detection of failure of said coolant temperature sensor.

12. The method of claim 9, wherein:

said idle intake air controlling step is performed using a valve having a stepper motor drive, said valve being disposed in a bypass intake air passage of said internal combustion engine to bypass a throttle valve of said engine; and said controlling step includes a step of controlling said valve to open substantially halfway responsive to detection of failure of said coolant temperature sensor.

13. The method of claim 12, wherein said controlling step includes a step of opening said valve substantially halfway by establishing a number of drive steps of said stepper motor to be a number of steps which is substantially half a maximum number of steps when failure of said coolant temperature sensor has been detected.

14. The method of claim 9, wherein:

said idle intake air controlling step is performed using a throttle valve wherein throttle degree of opening during idling is regulated by an actuator; and said controlling step includes a step of controlling an idle degree of opening of said throttle valve at a degree of opening which is substantially intermediate between upper and lower limits of idle degree of opening at a normal time responsive to detection of failure of said coolant temperature sensor.

15. The method of claim 14, wherein said controlling step includes a step of controlling an idle degree of opening of said throttle valve at an intermediate degree of opening of idle degree of opening when at low temperature and idle degree of opening after warmup responsive to detection of failure of said coolant temperature sensor.

16. The method of claim 9, wherein said controlling step includes steps of:

regarding coolant temperature when failure of said coolant temperature sensor has been detected as temperature after engine warmup; and performing fuel injection control and ignition timing control based thereupon.

* * * * *